US 6,944,754 B2

(12) United States Patent
Zilles et al.

(10) Patent No.: US 6,944,754 B2
(45) Date of Patent: Sep. 13, 2005

(54) METHOD AND APPARATUS FOR PARALLEL EXECUTION OF COMPUTER SOFTWARE USING A DISTILLED PROGRAM

(75) Inventors: Craig Buchanan Zilles, Champaign, IL (US); Gurindar S. Sohi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 470 days.

(21) Appl. No.: 10/263,514

(22) Filed: Oct. 2, 2002

(65) Prior Publication Data

US 2004/0068727 A1 Apr. 8, 2004

(51) Int. Cl.[7] .................................................. G06F 9/44
(52) U.S. Cl. ........................ 712/233; 712/200; 717/154; 717/159
(58) Field of Search ........................... 712/1, 200, 203, 712/233; 717/152, 153, 154, 159

(56) References Cited

U.S. PATENT DOCUMENTS 6,748,589 B1 * 6/2004 Johnson et al. ............. 717/150

2002/0144083 A1 * 10/2002 Wang et al. ................. 712/23

OTHER PUBLICATIONS

Sundaramoorthy et al., "Slipstream Processors: Improving both Performance and Fault Tolerance", ASPLOS 2000, Cambridge, MA, ACM, Nov. 12–15, 2000, pp. 257–268.*

Moshovos et al., "Slice–Processors: An Implementation of Operation–Based Prediction", Proceedings of the 15th International Conference on Supercomputing, Sorrento, Italy, 2001, ACM, pp. 321–324.*

* cited by examiner

Primary Examiner—William M. Treat
(74) Attorney, Agent, or Firm—Quarles & Brady LLP (57) ABSTRACT

Parallelization of a program is performed by creating a distilled version of the program having higher execution speed but with unverified execution. The distilled program is executed rapidly to create state snapshots of the program that may be forwarded to secondary processors for execution of the actual program in parallel with other secondary processors similarly allocated. Each state snapshot is verified as the task is executed on a secondary processor by the preceding processor. The degree of parallelization is limited only by the speed up of the distilled program.

37 Claims, 4 Drawing Sheets

METHOD AND APPARATUS FOR PARALLEL EXECUTION OF COMPUTER SOFTWARE USING A DISTILLED PROGRAM

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to methods and apparatus for executing a sequential computer program "in parallel" on multiple processors and in particular to a technique in which a distilled version of the program is used to coordinate the parallel execution.

Faster computer processing can be obtained with faster processors (e.g., processors having higher clock rates, larger data words, or more powerful instruction sets) or with more processors by dividing the processing task among a number of processors. This latter technique is termed parallel processing.

Programs can be explicitly written as parallel programs (also called multithreaded programs), but this is often more difficult than writing a sequential program with the same functionality. Also, sequential programs can be automatically converted into parallel programs by parallelizing compilers, but these techniques are currently limited to a small class of applications.

Two previous speculative parallel processing models include the multi-scalar model and the pre-execution model. In the multi-scalar model, the program to be executed is broken, to the extent possible, into independent tasks which are each assigned to a different processor. To the extent that the tasks are not truly independent, control information or data information must be exchanged between the tasks. When information needed by one task is generated by another task, the first task must stall and wait for the second task to complete. The problem of stalling can significantly limit the efficacy of the multiscalar model.

One approach to minimize stalling is to allow the task needing information to speculate as to what information it will receive, picking a data value or control path to continue execution. When the data or control information arrives, the speculation may be verified and if incorrect, the speculative execution may be "squashed" and the program "rewound" to the point of speculation and the correct data used. Nevertheless, so long as the prediction can achieve a certain accuracy, speculation provides speed advantage.

In the pre-execution model, the program is scanned ahead of its execution point on a first processor for problem areas that may slow the execution, for example, LOAD instructions accessing data outside the cache or unresolved BRANCH instructions. A second processor is assigned to these problem areas to pre-execute them. Again, speculation may be used when values required for the pre-execution are not immediately available.

BRIEF SUMMARY OF THE INVENTION

The present invention provides a new model for parallel execution in which a distilled version of the program is created that eliminates instructions in the program that rarely affect the program's execution and possibly applies other program simplifications. The result is a program that runs substantially faster than the original program, although without guarantee of accuracy. The distilled program is used to make predictions about data and control flow, which are then used to coordinate execution of the actual program among multiple secondary processors.

More specifically, a primary processor running the distilled program forwards a starting point (program counter value) and other necessary state data to the secondary processors to begin execution of a portion of the original program. The primary processor then executes the next portion of the distilled program and allocates a corresponding next portion of the original program to yet another secondary processor. As the secondary processors conclude their tasks, their state data is used to validate the state data assumptions of the distilled program.

The more the distilled program outperforms the original program the more secondary processors may be employed to execute the program in parallel More generally, the present invention provides a method of parallel execution of a program, including a first step of creating a distilled version of the program adapted to execute faster on a processor than the program. The distilled version of the program is executed on a primary processor and periodically a checkpoint is taken of the execution of the distilled version of the program, and this checkpoint state information is transferred from the primary processor to a secondary processor. The secondary processor commences execution of a portion of the program starting at a point corresponding to the point in the distilled program where the checkpoint was taken and using the state information from the distilled version of the program. This process is repeated for additional checkpoints using different processors for the secondary processor.

Thus, it is one object of the invention to provide for sophisticated control and data prediction through the use of a distilled program. The distilled program is designed to run faster but closely match the original program with respect to control and data values needed by the secondary processors.

The distilled program may be created by eliminating instructions whose probability of impacting the program's execution is below a predetermined threshold, for example, branch instructions for rarely taken branches. This probability may be determined by the step of profiling the program to see how it actually performs in use.

Thus, it is another object of the invention to provide a simple and possibly automatic method of generating the distilled program.

The amount of compression of the distilled program may be adjusted by changing the predetermined threshold at which instructions are removed.

Thus, it is another object of the invention to provide for a simple method of adjusting how aggressively the distilled program is "distilled", such as may be used to optimize the parallelization process.

The execution by the secondary processor may be preceded by the execution (by a different secondary processor) of the program concluding at the point in the execution where the secondary processor began. The ending state information from a preceding and different secondary processor may be compared to the state information received from the primary processor to identify erroneous state information produced by the primary processor.

Thus, it is another object of the invention to provide a simple method of verifying speculation and thus, of correcting mis-speculation.

The secondary processor or centralized hardware may do the step of comparing state information.

Another object of the invention is to delegate the burden of verification away from the primary processor The comparison may be limited to a portion of the state data generated outside the portion of the program executed by the secondary processor but used by the secondary processor in execution of the portion of the program.

Thus, it is another object of the invention to limit the amount of state data that needs be communicated between the processors for the purpose of verification.

State information that is unlikely to be used by a secondary processor before verification need not be computed by the primary processor. The computations that produce such state information can be removed from the distilled program.

Thus, it is another object of the invention to have the distilled program/primary processor to avoid computing data that will not be needed by a secondary processor to further improve the performance of the primary processor and reduce the amount of data that needs to be communicated between primary and secondary processors.

In addition to eliminating rarely used instructions of the program, the method of creating the distilled program may use one or more of the following optimization techniques known generally in the art: NOP elimination, dead code elimination, idempotent operation elimination, constant folding, function in-lining, register reallocation, scheduling, code layout, IF—conversion, and prefetching.

Thus, it is another object of the invention to allow standard program optimization and speculation techniques to be applied in producing the distilled version of the program.

The creation of the distilled program may include the step of adding markers (fork instructions) to the distilled version of the program to indicate where the primary processor should take a checkpoint and transfer the state information from the primary processor to the secondary processor.

It is thus another object of the invention to permit a simple mechanism for implementing the method through the addition of a specialized instruction.

The state information may include a program counter value at which the secondary processor should begin execution of the program.

Thus, it is another object of the invention to allow flexible partitioning of the distilled program into tasks for execution by secondary processors.

The state information sent from the primary to the secondary processor can be limited to that which differs from a reference set of state information (usually the non-speculative state).

Thus, it is another object of the invention to reduce the amount of state information that must be transmitted between the primary and secondary processor.

The checkpoints of the distilled version may be selected to minimize the amount of state information transferred from primary to secondary processor and that needs to be verified Thus, it is another object of the invention to provide task partitioning that is likely to lead to efficient allocation of portions of the program to the secondary processors.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE PREFERRED EMBODIMENT

The following description is that of a preferred embodiment of the invention in which functional elements may be implemented forms of software, hardware, or "firmware" sharing in the characteristics of both hardware and software. It will be understood to one of ordinary skill in the art that the particular form of implementation of a functional element is not critical to the invention and that variations in implementation from that described may be covered by the claims.

Figures 1, 2:
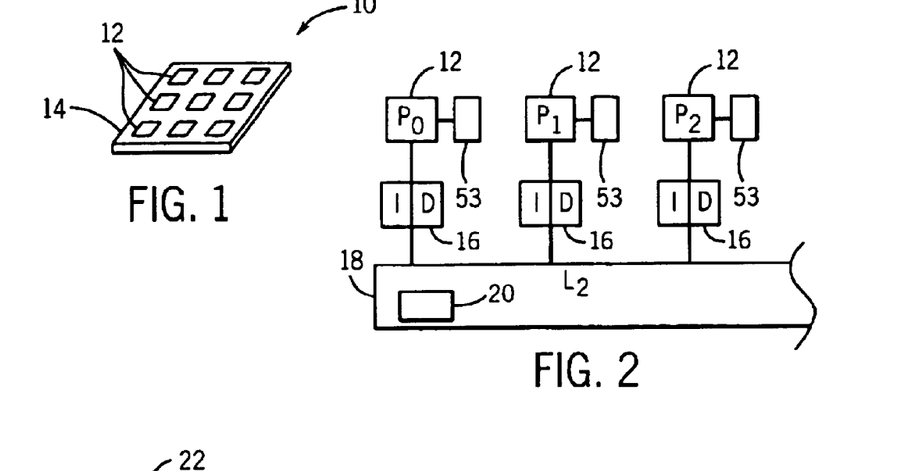
FIG. 1 is a simplified perspective view of a multiprocessor system such as may be tailored for use with the present invention.
FIG. 2 is a fragmentary schematic diagram of the multiprocessor system of FIG. 1 showing each processor communicating with an instruction/data cache and a common L2 cache, the latter holding partial checkpoints.

Referring now to FIG. 1, a single chip multiprocessor 10, suitable for use with the present invention, provides multiple processors 12 incorporated into a single integrated circuit substrate 14.

As shown in FIG. 2, each of the processors 12 designated $P_0$–$P_N$ includes a local instruction/data cache 16 and shares a common level two (L2) cache 18, which in turn communicates with memory (not shown). The L2 cache 18 provides a path of communication between the processors 12 which may be augmented with special control lines (not shown) understood to those of ordinary skill in the art and special partial checkpoint buffers 20 and live-in buffers 53 as will be described. The cache structure shown is not critical to the invention and the term "common memory" will henceforth refer to any shared memory structure including the L2 cache.

Figure 3:
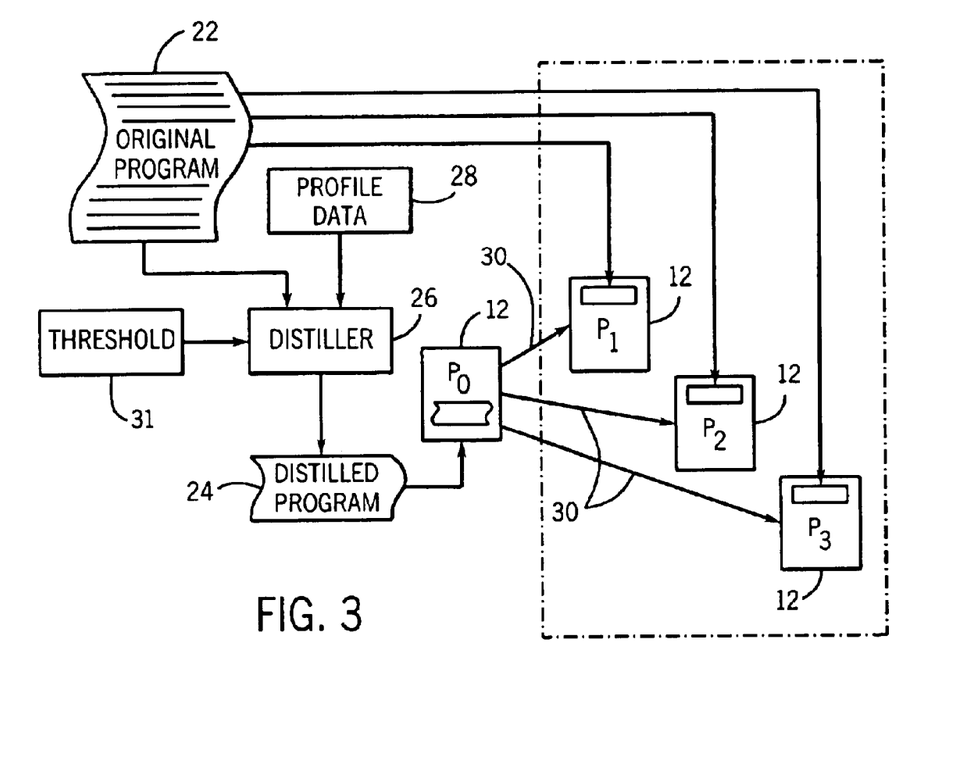
FIG. 3 is a flow diagram showing the steps of the present invention in producing a distilled program for execution on a first processor that coordinates execution of the original program on multiple secondary processors.

Referring now to FIG. 3, the present invention is intended for use with a program 22, (the "original program") that need not have been written or optimized for parallel execution on a multi-processor system 10. The program 22 may be numeric or non-numeric (e.g., word processing) and is generally unrestricted in kind. Source code of the program 22 may, but need not be available.

Preparation of the Distilled Program

Referring still to FIG. 3, at a first step, the invention processes the program to produce a distilled program 24 from that original program 22. The distilled program 24 has the qualities that it executes faster on a given individual processor than the original program 22. As will be explained in detail below, this increase in execution speed is principally from the elimination of instructions but may be from other optimization techniques as well, as will be described. Significantly, though, the distilled program sacrifices accuracy for speed. In this respect, the distillation process may make use of extremely aggressive optimization techniques.

Generally, the distilled program may be created off line prior to the execution of the program, creating a modified copy of the program, or may be created concurrently with execution of the program. As part of the process of constructing the distilled program, transition programs, as will be described, are constructed.

An example of the type of instructions eliminated from the original program 22 in creating the distilled program 24 are those instructions associated with branches that are highly biased to one direction. More generally, as will be understood from the following description, any instructions that do not affect control flow or form live-in values for other tasks may be eliminated.

The distilled program may be optimized in other ways as well, as will be described, that do not necessarily eliminate instructions, but that increase the rate of instructions executed.

The production of the distilled program 24 may be performed by a distiller program 26. In one embodiment, the distiller program 26 may receive profiling information 28 indicating how the program 22 executes on a historical basis. Profiling techniques that may make such measurements of running programs are well known in the art. The distiller program 26 may also receive an accuracy threshold value 31 (or set of thresholds) indicating how aggressively the distillation process should be undertaken. Generally, the accuracy threshold value 31 will be adjusted to balance the tradeoff between accelerating the execution of the distilled program 24 and the reducing time lost because of misspeculation errors as will be described. The accuracy threshold value 31 may be set empirically for each program 22.

Figure 4:
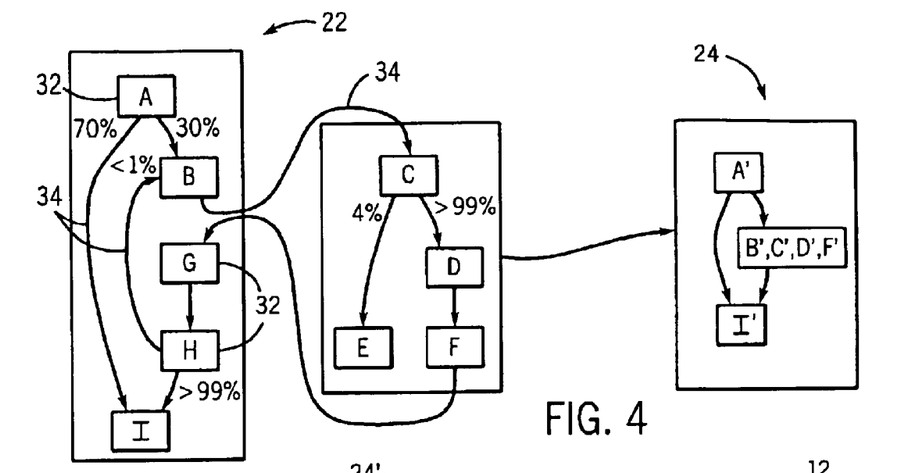
FIG. 4 is a simplified representation of a program as measured by a profiler showing use of the profile information in producing the distilled program of FIG. 3 having fewer instructions.

Referring now to FIG. 4, the original program 22 may include a variety of instruction blocks 32 labeled A through I, the instruction blocks 32 being arbitrary groupings of instructions. Control flow 34, indicated by arrows connecting the instruction blocks 32, describes how execution of the program 22 moves among the instruction blocks 32. The control flow 34 will generally change according to changing computation of values by instruction blocks 32 that control branch instructions.

A profiling technique may be used to collect statistics on actual control flow 34 in the original program 22 during a period of typical operation of the program 22 to assign percentage values to each branch in the control flow 34. Thus, for example, it may be determined that seventy percent of the time, the program 22 follows the left branch (to program block I) after instruction block A, and thirty percent of the time, follows the right branch to program block B. Likewise, after program block C, less than one percent of the time, the program 22 may branch to the left (to program block E) and ninety-nine percent of the time, may branch to the right (to program block D). The statistics collected need not be on forward branches only but may include, for example, backward branches such as from program block H to program block B which as shown occurs less than one percent of the time with the forward branch (to program block I) occurring ninety-nine percent of the time.

The statistics collected need not be on branch biases only but may include, for example, information on branch predictability, memory dependences, value invariance, cache behavior, path profiles, loop trip counts, and silence.

The statistics collected by the profiling operation may be used to produce the distilled program 24 by eliminating paths which are executed at a rate below the predetermined threshold 31. While eliminating instructions on rarely executed paths will not alone speed up the average execution of the distilled program 26, the removal of instructions also includes the branch instructions themselves (as well as instructions that compute the branch's outcome) which are always evaluated no matter which branch is taken.

In the example of FIG. 4, branches of less than one percent probability of execution are eliminated, that is, the branches from instruction blocks H to B and C to E along with their branch instructions. As noted above, however, the precise percentage threshold at which branches are eliminated is determined by the accuracy threshold value 31 which may be freely varied so, for example, the thirty percent branch from block A to B could, in theory, be eliminated as well.

In addition to the elimination of instructions described above, instruction blocks A, B, C, D, F, G, H and I that remain, have been shortened in other ways. The following list of optimizations are not exhaustive but are examples of well known methods that may also be applied to the original program 22 to produce a faster running distilled program 24.

(1) NOP elimination: removes compiler inserted NOPs (instructions that perform no operation.)

(2) Dead code elimination: removes instructions whose results never affect an active path. The elimination of branch instructions, previously described, increases the opportunity for dead code elimination.

(3) Idempotent operation elimination: eliminates instructions that produce a result that is consistently equal to one of its input operands. This often occurs with logical operations where one operand is always a superset of the other.

(4) Branch elimination: as described above, strongly-biased branches and their predicate computation, and branch instructions are removed.

(5) Constant folding: constants can be pushed into the offset field of a memory instruction. Stack pointer arithmetic can be collapsed if a function does not call other functions dynamically.

(6) Function In-lining: function "in-lining" puts the function in line with the code that calls it eliminating the recall and return instructions. Further, once in line, the function can be specialized to its call site eliminating other operations.

(7) Register Re-allocation: having removed other instructions and performed inlining (described above) provides the opportunity to allocate registers more efficiently than was done in the original code. This re-allocation often leads to removal of register saves and restores if fewer registers are required in the distilled program. Also, register moves can often be eliminated by register re-allocation.

(8) Additional Register Allocation: repeatedly accessed memory values can be allocated to a register if free registers are available eliminating time-consuming memory operations. Frequently the compiler is prevented from allocating registers because it cannot prove freedom from aliases. With a memory dependence profile, the distilled program can be attentive to frequent aliases when allocating registers.

These optimizations can work synergistically. Instructions removed by one optimization enable further instruction removal by another. In addition to reducing the dynamic instruction count, the distilled program can have a higher instruction per cycle execution speed than the original program. These known optimization techniques may also be used to improve the execution speed of the distilled program 24.

(1) Simplification: some of the previous optimizations such as register allocation, not only remove code but simplify the remaining code. Reducing LOADs, for example, reduces data flow height and contention for cache ports speeding execution.

(2) Scheduling: the elimination of branches provides the distilled program with larger instruction blocks which facilitates instruction scheduling. In addition, loads can be hoisted across basic blocks with impunity; exceptions caused by the distilled program are ignored.

(3) Reducing Static Code Size: removing instructions from active blocks and eliminating inactive blocks reduces static code size enabling more efficient use of the instruction cache.

(4) Code Layout: distillation may reduce the average number of discontinuous fetches (i.e. taken branches) through function in-lining, branch removal, and assigning the dominant branch target to the fall through path. Code layout can minimize instruction cache conflicts and increase the number of instructions fetched per cycle.

(5) If—Conversion: frequently mispredicted branches may be IF converted (using predication or CMOV instructions) to avoid branch misprediction penalties. Distilled programs create additional profitable opportunities for IF conversion by reducing the amount of code in the IF and ELSE clauses.

(6) Pre-fetching: cache miss profiling can guide scheduling of loads and insertion of pre-fetches.

Alternatively, or in addition, the distilled program may use a new or different instruction set executing faster and tailored to the purposes of the distilled program in coordinating multiple secondary processors. Similarly, the portions of the program executed by the secondary processor may be modified from the original program, particularly in ways that optimize their performance without speculation.

Further, the primary processor P0 may skip the evaluation of data values that are not used in the program until a large number of instructions later, where the large number of instructions makes it likely that a secondary processor (as will be described) will have evaluated the data value before the time it is required by the primary processor or another secondary processor. Thus, for example, a STORE A instruction many instructions before a LOAD A instruction may be ignored by the primary processor P0 if it is likely that a secondary processor will in any case have completed the STORE before the LOAD is required. The historical separation of instructions in previous execution cycles can be compared to a threshold value to make an assessment as to whether the instruction may be skipped.

While the above examples show various techniques that may be used to create the distilled program 24, the essential concern is that the distilled program 24 runs substantially faster than the original program 22, to provide an opportunity for multiple processor parallelization.

Further Processing of the Distilled Program and Original Program

Figure 5:
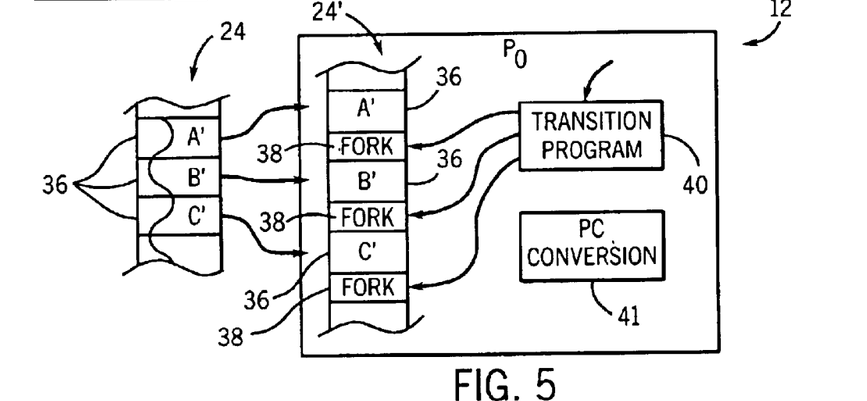
FIG. 5 is a figure showing separation of the distilled program of FIG. 4 into multiple tasks, each introduced by a fork instruction, and a transition program all executed by the primary processor.

Referring now to FIG. 5, the resulting distilled program 24 is readied for execution in the primary processor P0 (or by multiple processors serving as a primary processor P0) by further breaking it into tasks 36. Ideally the tasks are selected to be as independent as possible, however, the present invention accommodates a wide variety of interdependence, that is, later tasks 36 requiring data generated by earlier tasks 36. Generally, task boundaries are selected not to lie within a small loop or within a small function. The task boundaries may desirably be set to reduce live-in values being variables of a type as will be described below.

Prior to execution by the primary processor, $P_0$, a fork instruction 38 is added in between each task 36 defining where checkpoints should be taken in the modified distilled program 24'. Other methods of demarcating the tasks 36 may also be used.

The processor $P_0$ is also provided with transition code 40 which provides an entry back into the modified distilled program 24' in the event that a task 36 of the modified distilled program 36 must be restarted after the task 36 is squashed due to misprediction. The transition code 40 reinitializes the processor $P_0$ to state values existing at the time of the execution of the squashed task 36.

Figure 6:
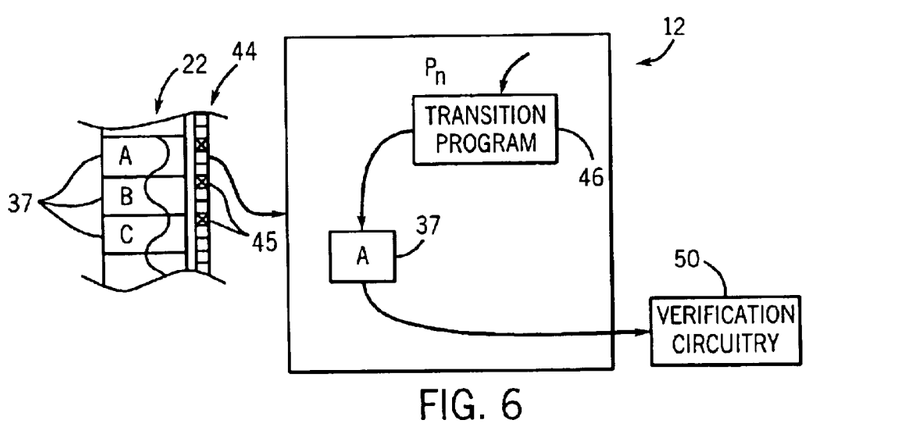
FIG. 6 is a figure similar to FIG. 5 showing separation of the original program into tasks with the beginning of each task marked, and showing one task, and a transition program executed by the secondary processors.

Referring now also to FIG. 6, the tasks 36 in the modified distilled program 24' labeled A', B' and C' have counterpart tasks 37 labeled A, B and C in the original program 22. Generally, as described before, task A will have a substantially longer execution time than task A' and likewise for each of the corresponding tasks 36 and 37.

A bit map 44 is associated with the original program 22 and has a bit corresponding with each instruction of the original program 22. Bits 45 of the bit map 44 may be set in the bit map 44 at the first instruction of each task 37 of A, B and C. These set bits allow the secondary processors 12 to recognize when they have completed their tasks 37 effectively allowing a single task 37 to be loaded into a secondary processor 12. Other mechanisms for identifying ends of tasks are possible.

Associated with the task 37 loaded into the secondary processor 12 is transition program 46 which may modify the state data that was transferred from the primary processor 12 so that it is as will be expected by the original program. The transition program 46 allows the distilled program to store data in different locations and re-order operations across fork instructions, as will be described.

Verification circuitry 50 whose operation is described below is accessible to each secondary processor 12.

Using the Distilled Program to Coordinate Parallel Execution of the Program

Referring again to FIG. 3, in overview, the distilled program 24 is executed by one of the processors 12 (in this case, $P_0$) that will be designated the primary processor. As the primary processor $P_0$ executes the distilled program 24, it periodically activates a secondary processor (in this example one of $P_1$ through $P_3$) to execute corresponding portions of the original program 22. At the time of this activation, the primary processor $P_0$, transfers state information 30, consisting of a starting program counter value and other state data, to the selected secondary processors $P_1$ through $P_3$ as will be necessary for the secondary processor 12 to begin execution of the original program 22 at the designated starting point. At a minimum, only variables modified by execution of the primary processor P0 need be sent as state information 30.

Figure 7:
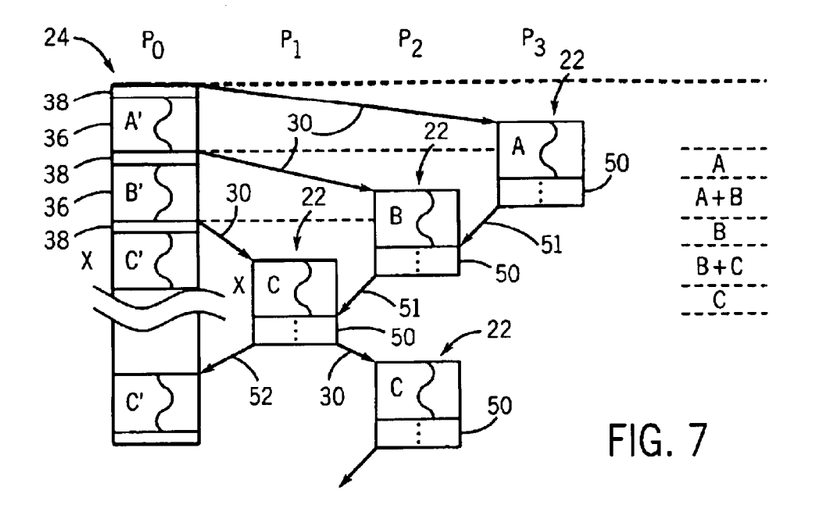
FIG. 7 is a figure showing the transfer of information between the primary and secondary processors as a function of time on a vertical axis, and further showing the verification process and squashing of task execution in the event of mis-speculation.

Referring now to FIG. 7, as the primary processor $P_0$ begins execution of the distilled program 24 it arrives at a fork instruction 38 signaling the beginning of task A'. The fork instruction 38 causes the processor $P_0$ to transfer current state data 30, including a program counter value and other data likely to be needed by task A, to a secondary processor $P_3$. The secondary processor is arbitrarily chosen from a pool of available processors 12 and need not occur in any particular sequence.

The chosen processor $P_3$ receiving the state information 30, executes the transition program 46 which may modify the state information 30 and may compute a starting program counter for task A in the original program. Execution of task A proceeds until the beginning of the next task is encountered as demarcated by the bit map 44.

Generally, task A' will execute much faster than task A and accordingly, the primary processor, $P_0$ will arrive at a second fork instruction 38 demarcating task B' prior to completion of task A by processor $P_3$. Upon encountering the second fork instruction 38, processor $P_0$ sends new state information 30, now updated by the execution of task A', to a second processor $P_2$ which happens to be available, causing it to load task B from the original program 22 and begin execution of task B. At this time, two processors, $P_2$ and $P_3$ are simultaneously (in parallel) executing portions of the original program 22. More than two processors 12 may be simultaneously executing portions of the original program depending on the degree of acceleration of the distilled program 42.

At some time after initialization of task B in processor $P_2$ task A in processor $P_3$ will complete and the verification circuitry 50 will be started. Because task A is a non-speculative task (the first task or the first after a recovery), the state information 30 received from the processor P0 by processor P3 will be assumed to be correct and the verification circuitry 50 provides a single function of transmitting verification state information 51 to processor $P_2$ executing processor B. The verification information is the data computed by task A that forms the state data 30 transferred to processor $P_2$ by processor $P_0$. The particular sequence of secondary processors 12 executing tasks may be recorded in commonly available memory by the verification circuitry 50 to identify processor P2 to which the verification state information 51 is to be sent. The data written by task A executing in processor P3 is then committed to memory, meaning that it is transferred from cache 16 to the L2 cache 18. Processor P3 is then available for additional task execution. Alternatively, the primary processor P0 may commit the data and the processor P3 may simply verify the execution of the primary processor.

Upon completion of task B by processor P2, processor P2 communicates with verification circuitry 50 reading the verification state information 51 from processor P3 and comparing it to the state information 30 previously provided to it by the primary processor P0. Generally, this data should match.

If a match is confirmed, then under the direction of the verification circuitry 50, the data written by task B is committed to memory and processor P2 is available for additional task execution.

Referring still to FIG. 7, during the execution of task B and operation of the verification circuitry 50, the processor P0 may continue execution of the distilled program 24 arriving at a fork instruction 38 preceding task C'. Again, state information 30 is transferred to an available processor, in this case P1, which begins execution of task C. Upon completing that execution and starting execution of a verification circuitry 50, processor P1 compares the state information 30 it received from processor $P_0$ to the verification state information 51 transmitted from processor $P_2$. In this case it is assumed that there is not a match.

Such a mismatch may be caused by mis-speculation of processor $P_0$ caused by the simplification of the distilled program 24 described above. For example, a rarely taken path may be taken or other prediction may prove improper.

The mismatch between the verification state information 51 and the state information 30 causes a mis-speculation condition. The first step in recovering from a misspeculation is to signal all processors working on parts of the execution logically after the misspeculation to abort their work. Then the correct state data 51 is communicated to yet another processor, in this case processor $P_2$, to restart execution of task C, as described above, using the correct input state information. In addition, the correct state data 51 is transmitted to processor $P_0$ to restart task C' after completing the transition code 40 to reset its internal state as is necessary.

In this way, the original program 22 may be executed in parallel by a number of processors according to predictions implicit in the rapidly executing distilled program 24.

Figure 8:
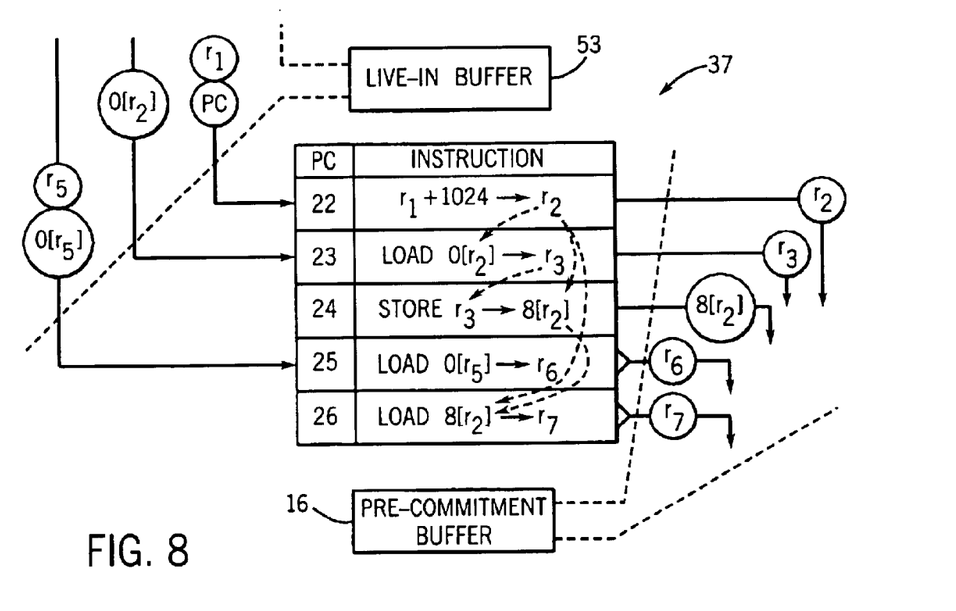
FIG. 8 provides example instructions of a task of FIGS. 5 and 7 showing live-in values and live-out values that must be transferred to and from the task to allow its execution and which are used for verification purposes.

Referring now to FIG. 8, the state information 30 and check verification state information 51 transmitted between processors, need not require an actual transmission of the entire memory space, but may be limited to values that have been changed as will now be described. Because the secondary processors have a (possibly stale) copy of the state information, or can retrieve one from the L2 and memory system, it is unnecessary for the primary processor to send a complete copy of the state information 30. Instead, only the differences (changes that have been made by the primary processor via stores and register writes) need to be sent by the primary processor. Similarly, the verification state information 51 communicated between secondary processors need not be a complete copy of state, but merely the differences introduced by the stores and register writes performed in the execution of the task in the original program. These differences can be (logically) broadcast to all processors to keep each processor's local state information in synchronization.

Figure 9:
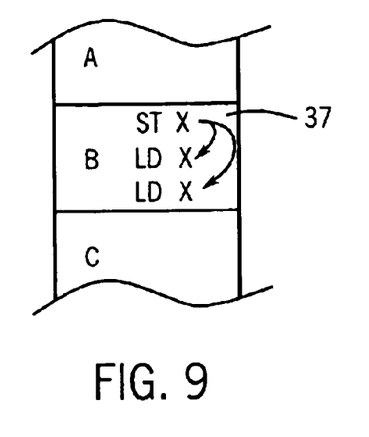
FIG. 9 is a simplified representation of the task of FIG. 8, showing internally generated and used values that need not be communicated to other tasks.

The whole state information does not need to be verified, but merely the live-in values, as will be described. In the example of FIG. 8, the processor 12 executing a task 37 needs a variety of values that will be retrieved from the state information 30. These live-in values can be tracked as they are used, using a live-in buffer 53 that records the name and value of each live-in value actually consumed by the task 37. Thus, at instruction program counter value twenty-two holding the instruction: r1+1024→r2, r1 is a live-in value consumed by the task 37 because it is used by the task 37 but not created in the task 37. On the other hand, values such as r2 created and consumed within the task 37 are not stored in the live-in buffer 53. Referring to FIG. 9, values produced and consumed within the task 37 are not live-in values for the purpose of verification.

Generally, the live-in values will be a subset of the state information 30. This means that only these live-in values in the buffer 53 need to be verified in the verification circuitry 50 and so the verification circuitry 50 consults the live-in buffer 53 in making this comparison. That is, as long as the values of the live-in buffer 53 match the verification state information 51 transmitted from the previous task, verification may be had even if other values in state information 30 and verification state information 51 do not match.

The task 37 also creates live-out values, being values generated by the task and used by other later tasks 37. In this case, r2 is a live-out value. Once the verification circuitry 50 completes its verification and commitment is made, live-out values are committed to cache L2. In the meantime, live-out values are stored in a precommitment buffer such as held in cache 16.

Figure 10:
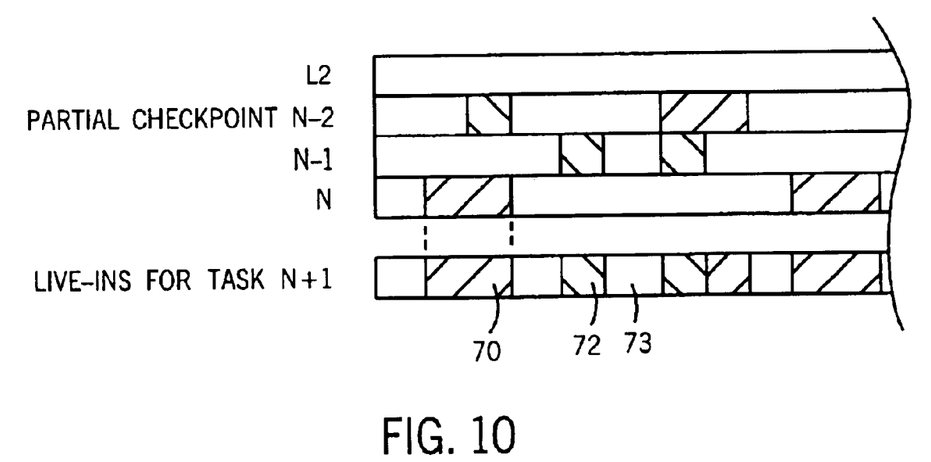
FIG. 10 is a graphic representation of the combination of partial checkpoints such as define the set of state data that must be sent to the secondary processors.

Referring now to FIG. 10, the transmission of state data 30 from the primary processor $P_0$ to the secondary processors $P_1$–$P_2$ need not be in the form of a discrete message but may be in values passed through the partial checkpoint registers 20.

More generally, each of the secondary processors $P_1$–$P_2$ may use the general system state indicated by the L2 cache 18 for most memory values, except those changed by tasks 36 of the distilled program that have not yet been verified by running of the actual program's corresponding task 37. Thus, referring still to FIG. 10, each task A', B' and C' executed by the primary processor $P_0$ may create partial checkpoint data (N−2, N−1, N) changed by those tasks A', B' and C'. This partial checkpoint data may be stored in the checkpoint registers 20 shown in FIG. 2 as part of the L2 cache 18. The partial checkpoint registers allow the L2 to keep multiple copies of a value and associate with each the task that created it.

Generally then, when a task A, B and C performed on the secondary processor 12 requires an external memory value, being possibly a live-in value, the secondary processor logically accesses each set of partial checkpoint data in reverse order (from N to N−2) looking for the first checkpoint set that contains the desired value. If no match is found, the system value of L2 is used. Thus, for task N+1 executed on a secondary processor, a value 70 required will be found at a first partial checkpoint data N and a value 72 will be found at a second partial checkpoint value 70 and a value 73 will be found in the general system state of L2.

If each processor has a private data cache and is executing a single task, the lookup in the partial checkpoint registers need only be performed once per value, as the resulting value can be cached in the primary data cache 16.

Because the partial checkpoint register 20 is only accessed on an L1 miss we avoid the increase in cache access time that would be required to sequentially access sets of partial checkpoint data stored in the cache 18. Each set of partial checkpoint data is de-allocated when the corresponding task is complete on a secondary processor and committed.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention. For example the invention is not limited to the multiprocessor system shown but may be used in a variety of multi-processor architectures including a multi-threaded processor rather than a multiprocessor, or a multiprocessor made up of multithreaded processors. Thus the term processor use herein should be held to cover both processors and threads of a multi-threaded processor.

We claim:

1. A method of parallel execution of a program comprising the steps of:
   a) creating a distilled version of the program adapted to execute faster on a processor than the program would execute on the processor;
   b) executing the distilled version of the program on a primary processor;
   c) periodically transferring state information from the primary processor to a secondary processor;
   d) commencing execution by the secondary processor of a portion of the program starting at a point corresponding to where the checkpoint was taken by the primary processor using the state information from the distilled version of the program; and
   e) repeating steps (b)–(d) for additional checkpoints and using different processors for the secondary processor.

2. The method of claim 1 wherein the step of creating a distilled version of the program eliminates some instructions of the program whose probability of execution is below a predetermined threshold.

3. The method of claim 2 including the step of accepting an input adjusting the predetermined amount.

4. The method of claim 2 wherein step (a) includes the step of profiling the program to monitor instructions executed during execution of the program and creating the distilled version of the program by removing instructions of the program executing less than a predetermined amount.

5. The method of claim 1 wherein the execution of step (d) by the secondary processor is preceded by execution by a different secondary processor of the program concluding at a point corresponding to where the checkpoint was taken, and including the further step of:
   (f) receiving state information from the different secondary processor at the checkpoint and comparing it to the state information from the primary processor at step (c) to identify erroneous state information from the primary processor.

6. The method of claim 5 wherein the comparing of step (f) is done by dedicated circuitry.

7. The method of claim 5 wherein the comparison of step (f) is further limited to only the data used by the secondary processor in execution of the portion of the program.

8. The method of claim 5 including at step (f) the step of squashing executions by the secondary processor and primary processor when the comparison of step (f) indicates that the state information from the primary processor was erroneous.

9. The method of claim 1 wherein the step (a) creates the distilled program by eliminating instructions of the program according to at least one technique selected from the group consisting of: NOP elimination, dead code elimination, idempotent operation elimination, constant folding, function in-lining, register re-allocation, additional register allocation, constant folding, and redundancy elimination.

10. The method of claim 1 wherein the step (a) creates the distilled program by increasing the number of instructions executed per cycle according to at least one technique selected from the group consisting of: strength reduction, constant propagation, scheduling, code layout, if-conversion and prefetching.

11. The method of claim 1 wherein step (c) is performed at predetermined points in the program.

12. The method of claim 11 wherein the predetermined points are demarcated by fork instructions added to the distilled version of the program, wherein the fork instructions cause the primary processor to transfer the state information from the primary processor to the secondary processor.

13. The method of claim 1 wherein step (d) includes the step of executing transition instructions by the secondary processor converting the state information provided by the primary processor from the distilled version of the program to correspond with the program portion executed on the secondary processor.

14. The method of claim 1 wherein the state information includes data providing a program counter value at which the secondary processor should begin execution of the program.

15. The method of claim 1 wherein at step (e) the different processors used as the secondary processors are selected from a pool of secondary processors according to availability of processors of the pool.

16. The method of claim 1 wherein the checkpoints of the distilled version of the program are selected to not fall within loops of the program having less than a predetermined size and not to fall within functions of the program having less than a predetermined size.

17. The method of claim 1 wherein checkpoint locations are selected to minimize the number of live-in values to a task.

18. The method of claim 1 wherein the distilled version of the program uses a different instruction set.

19. The method of claim 1 where the distilled program is created concurrently with the execution of the program.

20. The method of claim 1 where the step (d) does not use the original program, but a modified copy of the program.

21. The method of claim 20, where the distilled program is allowed to commit state, and the modified copy of the program is used to verify the execution of the distilled program.

22. The method of claim 1 where in step (c), only data modified by the primary processor is sent as state information by the primary processor.

23. The method of claim 1 where the distilled program is parallelized and multiple primary processors coordinate in its execution.

24. A multiprocessor integrated circuit for parallel execution of a program comprising:
  (a) a memory adapted to hold a program and a corresponding distilled version of the program, the distilled version of the program including fork instructions and adapted to execute faster on a processor than the program would execute on the processor; and
  (b) a plurality of processors communicating with the memory, the processors operating so that a primary processor may execute the distilled program and at a fork instruction transfer state information about current execution of the distilled program to a free secondary processor further causing the free secondary processor to begin execution of a portion of the program at a location in the program corresponding to the location of the fork instruction in the distilled version of the program, the free secondary processor using the state information, with the primary processor continuing execution of the distilled version of the program;
  whereby the distilled version of the program is executed by the primary processor contemporaneously with execution of the program by multiple secondary processors.

25. The multiprocessor integrated circuit of claim 24 wherein the processors operate so that each given secondary processor receives state information from a different secondary processor executing an earlier portion of the program and the multiprocessor integrated circuit compares that state information to the state information received by the given secondary processor from the primary processor to identify erroneous state information from the primary processor.

26. The multiprocessor integrated circuit of claim 25 wherein the processors operate so that a given secondary processor compares only data of the state information used by the given secondary processor in the execution of that portion of the program.

27. The multiprocessor integrated circuit of claim 25 wherein the processors further operate to squash execution of a program portion by a given secondary processor and the corresponding portion of the distilled version of the program by the primary processor when the comparison indicated that the state information from the primary processor was erroneous.

28. The multiprocessor integrated circuit of claim 24 wherein the state information includes data providing a program counter value at which the secondary processor should begin execution of the program.

29. A computer-readable medium containing a distiller program which when executed creates a distilled version of an application program for use in parallel execution of the application program on a multiple processor chip, the distiller comprising means for eliminating instructions having a non-zero probability of execution below a predetermined threshold and including checkpoints at which parallel execution of the program may be coordinated.

30. The distiller program of claim 29 including a profiler monitoring execution of instructions of the program, wherein the profiler identifies instructions that statistically that are used less than a predetermined amount and communicates this identification to the distiller program.

31. The distiller program of claim 29 wherein the distiller program accepts an input controlling the predetermined amount.

32. The distiller program of claim 29 wherein the distiller program further eliminates instructions of the application program according to at least one technique selected from the group consisting of NOP elimination, dead code elimination, idempotent operation elimination, constant folding, function in-lining, register re-allocation, additional register allocation, constant folding, and redundancy elimination.

33. The distiller program of claim 29 wherein the distiller program increases the number of instructions executed per cycle in the application program according to at least one technique selected from the group consisting of strength reduction, constant propagation, scheduling, code layout, if-conversion, and prefetching.

34. The distiller program of claim 29 wherein the distiller program adds fork instructions to the distilled version of the program, the fork instructions causing a primary processor executing the distilled program to transfer state information about current execution of the distilled program to a free secondary processor whereby the free secondary processor may begin execution of a portion of the program at a point corresponding to the location of the fork instruction using the state information, and with the primary processor continuing execution of the distilled version of the program so that the distilled version of the program is executed by the primary processor contemporaneously with execution of the program by multiple secondary processors.

35. A distilled version of an application program both the distilled version of the application program and the application program being embodied on a computer-readable medium, for use in parallel execution of the program on a multiple processor chip, the distilled program eliminating instructions of the program having a non-zero probability of execution below a predetermined threshold and including added fork instructions causing a primary processor of the multiprocessor chip executing the distilled program to transfer state information about current execution of the distilled program to a free secondary processor whereby the free secondary processor may begin execution of a portion of the application program at a point corresponding to the location of the fork instruction using the state information with the primary processor continuing execution of the distilled version of the program so that the distilled version of the program is executed by the primary processor contemporaneously with execution of the program by multiple secondary processors.

36. The distilled program of claim 35 wherein the distilled program eliminates instructions of the application program according to at least one technique selected from the group consisting of NOP elimination, dead code elimination, idempotent operation elimination, constant folding, function in-lining, register reallocation, additional register allocation, constant folding, and redundancy elimination.

37. The distilled program of claim 35 wherein the distilled program increases the number of instructions executed per cycle over the application program according to at least one technique selected from the group consisting of strength reduction, constant propagation, scheduling, code layout, if-conversion and prefetching.

* * * * *